Aug. 8, 1950     B. I. NOWACZEK     2,517,914
TACKLE BOX
Filed Sept. 20, 1947     2 Sheets-Sheet 1
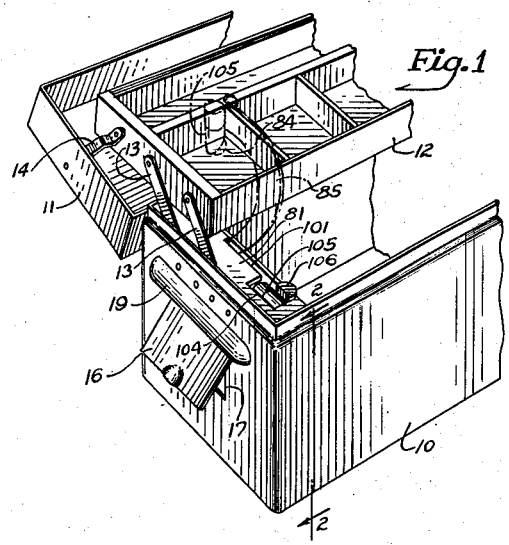
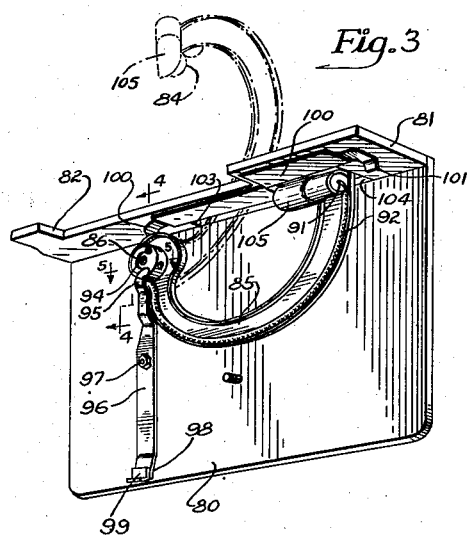
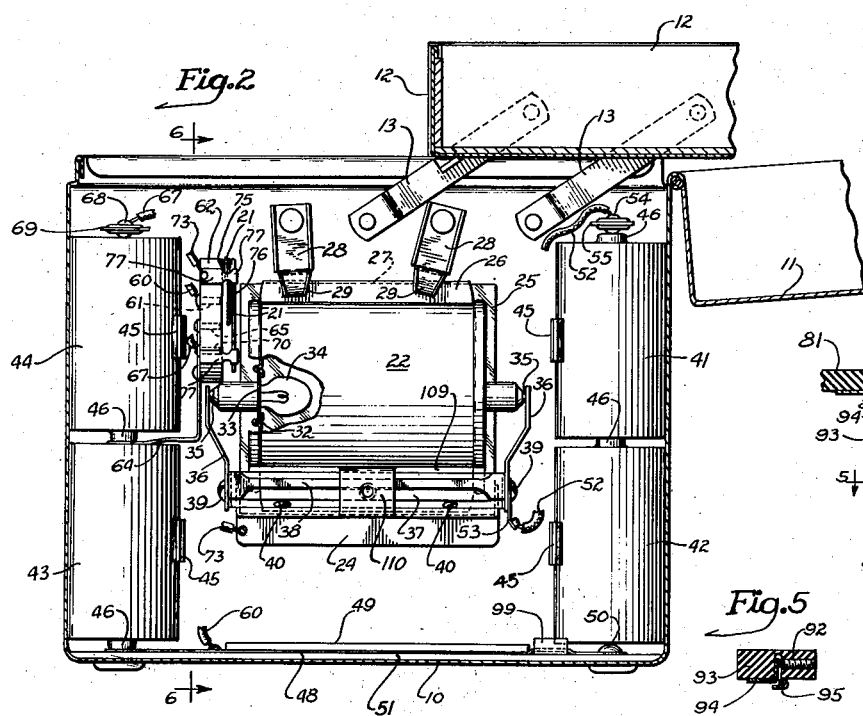
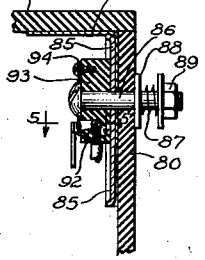
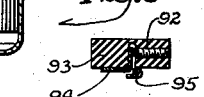
INVENTOR:
Bernard I. Nowaczek
BY
Atty.

Aug. 8, 1950     B. I. NOWACZEK     2,517,914
TACKLE BOX
Filed Sept. 20, 1947     2 Sheets-Sheet 2
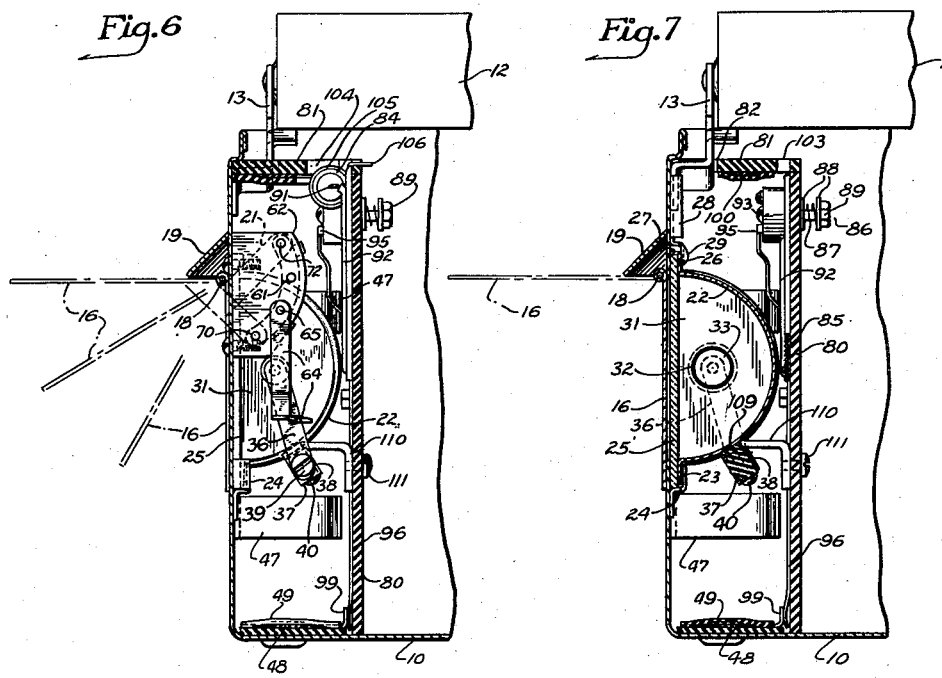
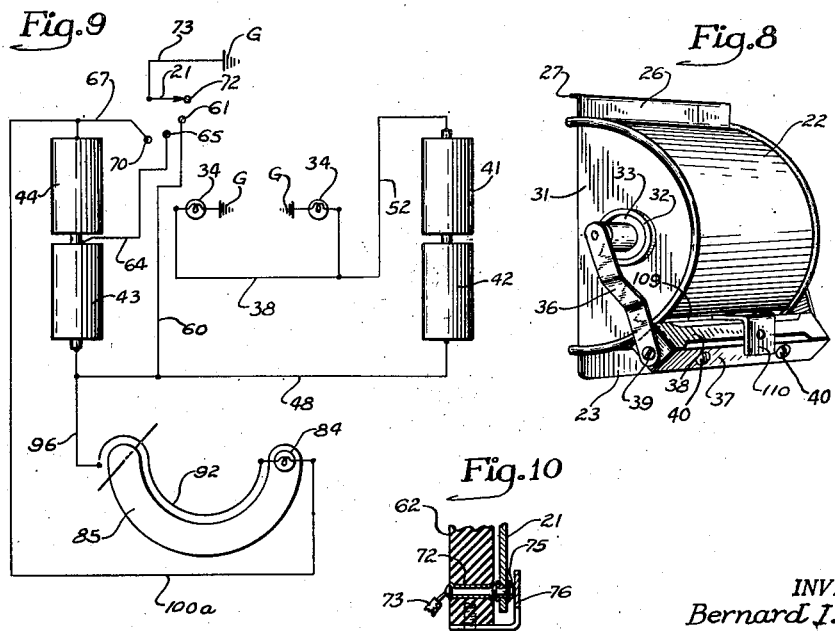
INVENTOR:
Bernard J. Nowaczek Patented Aug. 8, 1950

2,517,914

UNITED STATES PATENT OFFICE 2,517,914

TACKLE BOX

Bernard I. Nowaczek, Chicago, Ill.

Application September 20, 1947, Serial No. 775,165

5 Claims. (Cl. 240—6.4)

This invention relates in general to a tackle box and is more particularly described as a fishing tackle box with illuminating means in connection therewith by which the tackle box itself and the exterior of the tackle box may be faintly illuminated and also may be more brightly illuminated depending upon the amount of light required within a boat for examining objects adjacent thereto and for utilizing the box as a lantern.

An important object of the invention is to provide a variable illuminating means which is compactly arranged at one end of a tackle box consisting of a plurality of batteries which are connected in different ways to vary the illumination.

A further object of the invention is to utilize dry cell storage batteries either alone or in series in a compact arrangement at one end of the battery box so that they may be readily connected to a double lamp lighting means which may be made visible through the end of the box for illuminating purposes.

Still a further object of the invention is to provide a battery lamp attachment for a tackle box having a raisable lid for varying the lamp connections and a raisable lamp for illuminating the interior of the tackle box or a movable tray thereof.

Still a further object of the invention is to provide a battery lighting attachment which may be incorporated in one end of a tackle box without materially reducing the size of the box for illuminating the interior of the box itself and for illuminating the exterior of the box with a variable light through a normally closed aperture.

Other objects of the invention will appear in the specification and will be apparent from the accompanying drawings in which, Fig. 1 is a perspective view of one end of a fishing tackle box illustrating the lighting means of the present invention applied thereto;

Fig. 2 is an elevational view of the lighting equipment applied to the interior of the box as viewed in a transverse plane taken on the line 2—2 of Fig. 1;

Fig. 3 is a perspective view of a partition for enclosing the lighting means as shown more particularly in Fig. 2 and also showing the lamp for illuminating the interior of the box or a raised tray thereof as shown in Fig. 1;

Fig. 4 is a sectional detail as taken on the line 4—4 of Fig. 3;

Fig. 5 is a sectional view of one of the connectors as taken on the line 5—5 of Fig. 3;

Fig. 6 is a sectional view of the lighting means as taken on the line 6—6 of Fig. 2;

Fig. 7 is a sectional view similar to Fig. 6 but showing the reflector and some of the other parts in section;

Fig. 8 is a perspective view of the rear of the reflector;

Fig. 9 is a wiring diagram showing the connections for lighting the lamps with two, three or four batteries in series; and Fig. 10 is a sectional detail of the contact arm and one of the contacts.

While this invention may be applied to boxes and containers for other purposes, it is particularly designed and intended for a fishing tackle box having a main receptacle 10, a hinged cover 11 and a tray 12 mounted on parallel arms 13 to swing from a position partially within the upper portion of the receptacle to a position partially overlying the top of the receptacle and the cover when the cover is open. The movement of the tray may be effected by an arm 14 at each end of the tray pivoted at one end to the tray and pivoted at the other end to the inside of the cover. This construction is commonly employed in tackle boxes, tool boxes, and other receptacles of this kind.

For fishing at night, it is desirable to illuminate the tray 12 for selecting different hooks, lures, or other fishing equipment, and it is also desirable at times to have some illumination within a boat or outside of the tackle box either when the tray is illuminated or separately therefrom. For the separate illumination outside of the box, a door 16 is hinged at the top of a door opening 17 so that it will swing upwardly upon a hinge 18 below an outwardly inclined guard 19. This guard protects the top of the door and its hinge from the weather and prevents water from entering at the top of the opening.

At the inside of the receptacle, an arm 21 which is connected at the top of the door 16 extends inwardly and forms means for operating a switch for making connections as hereafter described. At the inside of the door opening is a reflector 22 semi-circular in shape with a lower flange 23 adapted to be seated within an angular strip 24 which is secured to the inside of the receptacle below the door opening and also to seat a glass window 25 therein. At the top of the reflector is a flange 26 with a bent edge 27 to fit over the upper edge of the window 25. This flange is engaged by two clips 28 pivoted above the door opening and each having an offset finger 29 at its free end for engaging over the flange and holding it tightly in place when the clip is rotated downwardly with its finger 29 into engaging position therewith.

At each end of the reflector is a plate 31 having a flanged opening 32 for receiving a projecting flange 33 of a lamp 34, which forms one terminal for the lamp in contact with the reflector, which is grounded. The lamp end 35 forms the other terminal contact and is adapted to be engaged by a movable spring finger 36 pivoted to one end of an insulating block 37 secured at the rear lower side of the reflector and having a conductor 38 which extends between the ends and connects the two lamps in parallel. Each spring finger 36 is mounted to rotate upon a pivot screw 39 so that the spring finger may be moved out of the way for easily inserting and removing a new lamp at either end of the reflector when it is necessary. The insulating block is secured by fastening screws 40 inserted through the block into the rear of the reflector 22.

The reflector and the door 16 being located somewhat centrally of the end of the receptacle provide spaces at the sides for receiving a plurality of dry batteries 41, 42, 43 and 44. Each dry battery is held in place by a spring fastening clip 45 secured to the end of the receptacle and the batteries on opposite sides are disposed oppositely; that is, each battery is of the type having opposite contacts at the ends of the battery, a projection 46 at one end of a battery engaging the end of another battery, the projections 46 being disposed upwardly at the right side of Fig. 2 and downwardly at the left side of this figure. For connecting the batteries at opposite sides in series, a contact strip 48 at the bottom of the receptacle extended between a bottom insulating strip 51 in contact with the bottom of the receptacle and an insulating guard strip 49 over the top of the strip 48. The strip 48 at one side has a projection 50 for engaging the end of battery 42 which has no projection at that end.

A conductor 52 is connected to a fastening clip 53 secured by one of the fastening screws 39 to the contact strip 38 which is in electrical connection with both of the lamps 34. The other end of this conductor 52 is connected to a contact 54 held by a fastening clip 55 from which it is insulated in contact with the projection 46 of the battery 41. Connected to the conductor strip 48 is a conductor 60 which is connected to a contact 61 preferably in the form of a hollow rivet which extends through an insulating block 62 adjacent the top of one side of the door opening.

At the upper end of the battery 43 is a conductor 64 in the form of a thin plate extending between the projection 46 of the battery 44 and the adjacent end of the battery 43, and this conductor is connected to a terminal rivet 65 extending through the insulating block 62. At the top of the battery 44 is a conductor 67 which is connected to a terminal contact 68 held in place against the upper end of the battery by an insulated terminal clip 69 secured to the end of the receptacle. At the other end, the conductor 67 is connected to a hollow contact terminal 70 extending through the block 62 and providing a separate terminal therein. At the upper end of the block 62 is a similar terminal rivet 72 which serves as an index point to engage the arm 21 of the door 16 to secure it in closed position.

These terminal rivets 72, 61, 65 and 70 are arranged in an arc and are engaged by an insulated projection 75 extending through both sides of the arm 21 near the extremity thereof. Preferably the projection 75 (as shown in Fig. 10) is rounded at the ends and adapted to enter and engage in the open end of each of the hollow rivets 72, 61, 65 and 70 at one side of the block 62. In order to hold the arm and its projection 75 in close engagement with each of the hollow rivets and to provide a common ground connection, a spring rail 76 is mounted upon arms 77 secured to the edge of the block 62 and extending over the side thereof, and the rail bears against the outer end of the insulated projection 75 carried by the arm. A conductor 73 extends from one arm 77 to the angular strip 24 at the bottom of the door opening, constituting a common ground connection.

To enclose the batteries and lighting equipment at one end of the receptacle, an insulating partition 80 is of a proper size to fit in the end of the receptacle over the batteries and lighting equipment with a flange 81 at the upper edge to overlie the lighting equipment at the top. In this flange is a recess 82 through which the parallel arms 13 for mounting the tray 12 are freely movable. The partition also carries a tray illuminating lamp 84 mounted upon a curved arm 85 rotatable upon a pivot 86 at one end extending through the partition 80. The pivot has a spring 87 surrounding the pivot between washers 88 and held in clamped relation by a nut 89 so that the arm 85 will return freely and will be retained in any adjusted position by the resilient engagement of the spring 87. The lamp 84 is preferably of the screw base type which is grounded upon the arm 85 and a contact extremity 91 is connected to an insulated conductor 92 extending along and secured to the arm 85 and into an insulating block 93 through which the pivot 86 extends. Within the block, the conductor 92 is connected to a curved contact strip 94 at the outer side of the block 93. This contact strip 94 is adapted to be engaged by an overlying extremity 95 of a conductor strip 96 held in engagement with the inside of the partition 80 by a fastening screw 97. At the lower end of the contact strip is a bent extremity 98 for engaging an up-turned projection 99 attached to the bottom conductor strip 48 which exends between batteries 42 and 43.

The arrangement of the strip 96 is such that when the arm 85 is in its lowered position, the contact extremity 95 does not engage the contact strip 94, but as soon as the arm 85 is raised, an engagement is completed through the conductor 96, contact strip 94, and conductor 91 to the lamp 84. To insure that a ground is completed, a conductor strip 100 is secured to the under side of the flange 81 with one end in contact with the arm 85 near its pivot, and the other end formed with an outer bent extremity 101 adapted to engage contact terminal 68 at the upper end of the battery 44. Thus a lighting circuit is closed through the batteries 43 and 44 to light the lamp 84 whenever the arm 85 is raised.

In the flange 81 of the partition is a narrow slot 103 through which the arm 85 may be moved upwardly and at the outer end of the arm is a recess 104 in which the lamp 84 may be seated. Preferably the lamp is provided with a small metal guard 105 which may be sprung over the lamp and adjustable circularly about it to form a movable reflector. At this end of the arm is a bent extremity 106 which extends over the edge of the partition 80 to limit the downward movement of the arm and also to form a finger engaging projection by means of which the arm may be raised through the slot 103 to overlie the tray 12 as shown more clearly in Fig. 1. The slot 103 terminates close to the pivot and limits the movement of the arm 85. The lamps 34 are preferably of the three battery type; that is, they are illuminated properly by three batteries in series, but also they are sufficiently illuminated to make some light with two batteries, and of course, will give more illumination with four batteries in series.

The arrangement of the batteries is such that when the door 16 is raised to engage the first contact 61, a circuit is closed from the lamps 34 by way of conductors 38 and 52 through batteries 41 and 42 in series, conductor strip 48 and conductor 60 to the contact 61, thence through the arm 21, contact rail 76, and conductor 73 to ground. The other terminal of each of the lamps 34 is connected to the reflector shell which is grounded, so that a circuit is complete. When the door 16 is raised to engage the next contact 65, the first two batteries are connected as before and battery 43 is added in series by means of a conductor 64 which extends to contact 65. Likewise when the door 16 is raised to its highest position, battery 44 is added in series to the other three by means of a conductor 67 extending to contact 70.

In the diagrammatic arrangement of connections as shown in Fig. 9, the tray lighting lamp 84 carried at the end of the arm 85 is represented as connected to conductor strip 48 by a conductor 96 and a connector 92 to the lamp and from the lamp by means of a conductor 100a (conductor strip 100) to the upper end of battery 4. Thus the lamp 84 is connected to the terminals of batteries 43 and 44 in series regardless of the position of the door 16; that is, the tray lamp 84 receives current whether the door is raised or not.

In order to attach the partition 80 in place at the end of the tackle box, or other receptacle, a bracket 110 is formed as an extension of a strip 109 inserted between the block 37 and the reflector 22 and held firmly in place by screws 40. The bracket is bent downwardly at the outer end to receive a screw 111 inserted through the partition and into the bracket. This will hold the conductor strip 96 in contact with the up-turned projection 99 of the conductor strip 48 and it will hold the bent extremity 101 of the contact strip 100 in engagement with the upper contact terminal 68 of the battery 44.

With this construction, all of the parts are readily attachable at the end of a tackle box or other receptacle, the reflector is removably inserted over a door opening, and the door is movable to close connections with either two, three or four batteries in series to illuminate both of the lamps 34 in parallel, depending upon the amount the door is open. This lighting equipment is enclosed by the partition 80 and its flange 81 so that interior space of the receptacle is only reduced by a small amount at one end substantially the thickness or diameter of one of the batteries. Each battery is removably held in place by a spring fastening clip 45 and the connections to the ends of the battery are permanently installed so that any battery may be removed or replaced independently of the others. The tray lighting lamp takes no additional space from the container since it is mounted on the inside of the partition free from engagement with the lighting batteries, but using two of the batteries for lighting it. The tray lighting lamp may be used alone or in conjunction with any of the other lamp combinations depending upon the extent to which the door 16 is open.

While a preferred construction and arrangement of this invention has been described in some detail as applied particularly to a tackle box, this should be regarded as an illustration or example of the invention and not as a limitation or restriction of the invention, as various other constructions, combinations, and arrangements of the various parts may be made with other receptacles without departing from the spirit and scope of the invention.

I claim:

1. A tackle box having a hinged cover and a tray connected to swing upwardly with the cover and varied above the box when the cover is opened, in combination with an opening in the end of the box closed by a door hinged to the box, batteries in the end of box at the sides of the opening, lamps in the box to shine outwardly through the opening, an arm and a lamp mounted upon said arm swingable upwardly from within the box to a position where one end of the arm and the lamp carried thereby overlies the tray in raised position, and means operated by the door including circuit connections for illuminating the lamps in the box by connecting more of the batteries in series with the lamps as the door is raised, the lamp on the arm being illuminated by two of the batteries connected therewith in series.

2. The combination with a receptacle, of a lighting attachment for one end of the receptacle comprising an end opening closed by a door, an arm pivoted in the same end of the box to swing upwardly and having a lamp at the free end, lamps mounted in the box to shine out of the opening, batteries in the end of the box, means for connecting certain of the batteries to light the lamp at the end of the lever as soon as the free end of the lever is raised from the receptacle, and means operated by the door for connecting additional batteries in series to light the lamps which shine from the end opening and to increase the illumination therefrom depending upon the amount the door is opened.

3. In a lighting attachment for the end of a receptacle which has an opening therein and a door for closing the opening, a plurality of batteries, a pair of lamps and a reflector therefor to direct light out of the opening, an arm extending inwardly from the door, a succession of contacts engaged by the arm and having connections to the lamps and batteries with connections for joining two, three or four batteries in series for varying the lamp illumination depending upon the amount the door is opened, a transparent closure for the opening, flanges at the top and bottom of the reflector, a strip at the bottom of the opening in which the lower edge of the said closure and the lower flange of the reflector are seated, and pivoted fastening clips at the top of the opening movable to engage the top of the closure and the upper flange of the reflector for binding them in place.

4. A lighting attachment to shine through an opening at the end of a receptacle and to illuminate the interior of the receptacle, comprising a plurality of batteries and means to mount them at the end of the receptacle at the sides of the opening, a reflector with lamps in it to fit inside of the opening, a partition to enclose the lamps, reflector and batteries in a narrow transverse space at the end of the receptacle, the partition having a flange at the top to extend over the narrow transverse space, an arm pivoted to the partition to swing upwardly through an opening in the flange, a lamp at the end of the arm which swings through the flange, and connecting means for lighting the lamps in the reflector and the lamp at the end of the arm.

5. In a lighting attachment according to claim 4, the partition and flange being separable and removable from the batteries, the reflector and the lamps therein, and from conductors connecting the batteries, the partition having a conductor strip to engage a conductor extending between two batteries, and a perforated bracket extending from the back of the reflector, a fastening screw extending through the partition to engage the bracket to clamp the partition to the reflector and to hold the strip conductor in said electrical connection.

BERNARD I. NOWACZEK.

REFERENCES CITED

The following references are of record in the file of this patent:

UNITED STATES PATENTS

| Number | Name | Date |
| --- | --- | --- |
| 977,721 | Everett | Dec. 6, 1910 |
| 1,193,825 | Roop | Aug. 8, 1916 |
| 1,280,370 | Beckmann | Oct. 1, 1918 |
| 1,321,196 | Farb | Nov. 11, 1919 |
| 1,406,452 | Evans et al. | Feb. 14, 1922 |
| 1,419,922 | Corbe | June 13, 1922 |
| 1,531,288 | Johnston | Mar. 31, 1925 |
| 1,987,448 | Pearson | Jan. 8, 1935 |
| 1,993,250 | Smith | Mar. 5, 1935 |
| 2,161,872 | Kostal | Jan. 13, 1939 |
| 2,290,419 | Dunn | July 21, 1942 |